US007130399B1

(12) United States Patent
Jean et al.

(10) Patent No.: US 7,130,399 B1
(45) Date of Patent: *Oct. 31, 2006

(54) METHODS AND SYSTEMS FOR ASSEMBLING TELEPHONE LINE RECORDS

(75) Inventors: David R. Jean, Palo Alto, CA (US); Judy M. Marcopulos, Duluth, GA (US); Rita H. Scherer, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 474 days.

This patent is subject to a terminal disclaimer.

(21) Appl. No.: 09/946,405

(22) Filed: Sep. 4, 2001

(51) Int. Cl.
*H04M 15/00* (2006.01)
*H04M 3/22* (2006.01)

(52) U.S. Cl. ...................... 379/126; 379/9.02; 379/9.03

(58) Field of Classification Search .............. 379/9.01, 379/9.02, 9.03, 9.04, 126, 112.01, 114.03, 379/127.01, 121.05, 133, 221.09, 111, 243, 379/246; 707/10; 709/217, 219
See application file for complete search history.

(56) References Cited

U.S. PATENT DOCUMENTS

| 4,464,543 A | 8/1984 | Kline et al. | |
| 5,155,761 A | 10/1992 | Hammond | 379/67 |
| 5,285,494 A | 2/1994 | Sprecher et al. | |
| 5,406,616 A | 4/1995 | Bjorndahl | 379/59 |
| 5,689,550 A * | 11/1997 | Garson et al. | 379/88.18 |
| 5,784,438 A | 7/1998 | Martinez | 379/89 |
| 5,790,633 A * | 8/1998 | Kinser et al. | 379/9.02 |
| 5,793,771 A | 8/1998 | Darland et al. | 370/467 |
| 5,893,906 A | 4/1999 | Daffin et al. | |
| 5,937,048 A | 8/1999 | Pelle | |
| 5,946,372 A | 8/1999 | Jones et al. | |
| 5,946,373 A | 8/1999 | Harris | |
| 5,956,024 A | 9/1999 | Strickland et al. | 345/327 |
| 6,006,171 A | 12/1999 | Vines et al. | |
| 6,018,567 A | 1/2000 | Dulman | |
| 6,032,039 A | 2/2000 | Kaplan | 455/413 |
| 6,173,047 B1 | 1/2001 | Malik | 379/207 |
| 6,175,859 B1 | 1/2001 | Mohler | 709/206 |
| 6,263,322 B1 | 7/2001 | Kirkevold et al. | |
| 6,289,382 B1 | 9/2001 | Bowman-Amuah | |

(Continued)

FOREIGN PATENT DOCUMENTS

WO    WO 02/45393 A2    6/2002

OTHER PUBLICATIONS

An Extensible Message Format for Message Disposition Notifications, R. Fajman, National Institutes of Health, Mar. 1998.

(Continued)

*Primary Examiner*—Barry Taylor
(74) *Attorney, Agent, or Firm*—Cantor Colburn LLP (57) ABSTRACT

Methods and systems are disclosed for assembling a line record for a customer's telephone number. One embodiment communicates with a communications network and acquires, in real time, at least one of i) information associated with the customer's service, ii) facility information associated with the customer's service, and iii) information associated with equipment used by the customer. The acquired information is assembled as the line record. An alternative embodiment communicates a request, over a communications network, for the line record. This alternative embodiment acquires, in real time, at least one of customer information from a Customer Record Information System, facility information from a Loop Facility Assignment Control System, and equipment information from a switch system. The acquired information is assembled as the line record, wherein each request for the line record is comprised of fresh data.

10 Claims, 11 Drawing Sheets

U.S. PATENT DOCUMENTS

| | | |
|---|---|---|
| 6,295,540 B1 | 9/2001 | Sanschargrin et al. |
| 6,353,902 B1 | 3/2002 | Kulatunge et al. |
| 6,356,928 B1 | 3/2002 | Rochkind |
| 6,401,090 B1* | 6/2002 | Bailis et al. .................. 707/9 |
| 6,445,774 B1* | 9/2002 | Kidder et al. ............. 379/9.03 |
| 6,446,123 B1 | 9/2002 | Ballantine et al. |
| 6,493,694 B1* | 12/2002 | Xu et al. ..................... 706/47 |
| 6,614,882 B1 | 9/2003 | Beamon et al. |
| 6,633,782 B1 | 10/2003 | Schleiss et al. ............... 700/26 |
| 6,636,486 B1 | 10/2003 | Magloughlin ............... 370/252 |
| 6,678,370 B1 | 1/2004 | Freebersyser et al. |
| 6,788,765 B1 | 9/2004 | Beamon |
| 6,845,148 B1 | 1/2005 | Beamon |
| 6,870,900 B1 | 3/2005 | Beamon |
| 6,961,415 B1 | 11/2005 | Doherty et al. |
| 2001/0029504 A1 | 10/2001 | O'Kane, Jr. et al. ........ 707/101 |
| 2002/0161731 A1* | 10/2002 | Tayebnejad et al. .......... 706/20 |
| 2003/0069797 A1 | 4/2003 | Harrison ..................... 705/26 |
| 2004/0260668 A1 | 12/2004 | Bradford |

OTHER PUBLICATIONS

Impact Voice Mail Server Deluxe, Black Ice Software Inc., CTI Expo, Spring 1999.

BellSouth Memory Call VoiceMail Services, 1999.

Voice Profile for Internet Mail—Version 2, G. Vaudreuil—Lucent Technologies and G. Parsons—Northern Telecom, Sep. 1998.

IP Infrastructure: The Fastest Track for Tomorrow's Unified Communications, Arthur Rosenberg and David Zimmer, The Unified View, Oct. 2000.

TDB: Computerized Call Return Feature, IBM Technical Disclosure Bulletin, Apr. 1986.

* cited by examiner

FIG. 11 ed within walls and floors of buildings, so a single cable fault may require several trained technicians and special equipment. Construction crews and demolition crews can inadvertently severe telephone service to hundreds, even thousands, of customers. Storms, floods, and other natural disasters can interrupt telephone service and require thousands of man-hours. Even exposure to ozone, summer heat, winter cold, and water deteriorates and degrades the copper cable and wires. The public telephone system, therefore, with its billions of copper telephone lines, requires a structured maintenance plan to ensure telephone customers receive the highest quality telephone service.

METHODS AND SYSTEMS FOR ASSEMBLING TELEPHONE LINE RECORDS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to telephony and, more particularly, to methods and systems for assembling real time telephone line records.

2. Description of the Related Art

Most residential and business telephone customers are connected to telephone systems by copper cables and wires. These copper cables are the familiar one or more telephone lines running throughout nearly every home in the United States. Because copper cable and wire connects each home, and many businesses, to the telephone system, the Public Switched Telephone Network is composed of billions of copper cables and wires. Each of these copper cables must be maintained to provide superior telephone service to the customer.

Yet maintaining these copper cables and wires is an extraordinary task. The Public Switched Telephone Network, with its billions of copper cables and wires, may receive hundreds of maintenance calls per day. Copper cables and wires, for example, are strung from telephone poles, buried underground, and installed within walls and floors of buildings, so a single cable fault may require several trained technicians and special equipment. Construction crews and demolition crews can inadvertently severe telephone service to hundreds, even thousands, of customers. Storms, floods, and other natural disasters can interrupt telephone service and require thousands of man-hours. Even exposure to ozone, summer heat, winter cold, and water deteriorates and degrades the copper cable and wires. The public telephone system, therefore, with its billions of copper telephone lines, requires a structured maintenance plan to ensure telephone customers receive the highest quality telephone service.

One obstacle to implementing a structured maintenance plan is accurate telephone line records. Telephone line records should accurately describe a customer's telephone service, the condition of telephone system physical facility, and the telephone equipment installed at the customer's residence or business. When a customer calls to report a telephone problem, accurate line records help identify the problem and speed resolution. Telephone line records, however, are often outdated with incorrect information. This incorrect information often hampers maintenance efforts.

Telephone line records are often incorrect because of a manual environment. Telephone line records are maintained in static databases that require manual updating. Whenever telephone line records are to be updated, someone must manually enter the updated information. Although these manual updates may be performed on a regular basis, the millions of updates can require hundreds of man-hours. The telephone line records then rarely reflect current information. These manual updates are also prone to human error, so even timely information may be erroneously entered. This manual environment is also obviously expensive. The telephone line records, therefore, often represent outdated, irrelevant information, and inaccurate telephone line records hamper implementation of a structured maintenance plan.

There is, accordingly, a need in the art for dynamically assembling line records that reduce the need for manual updates, that are faster and more accurate than current implementations, and that are less expensive to operate and to maintain.

BRIEF SUMMARY OF THE INVENTION

The aforementioned problems are reduced by a Line Record Assembler module. The Line Record Assembler module comprises a system that may be implemented in a computer program. The Line Record Assembler module acquires real time information and assembles the acquired information as the telephone line record. The Line Record Assembler module, for example, may acquire one, or more, of the following types of information: customer service information associated with a customer's telephone service, facility information associated with the telephone physical plant, or "local loop," serving the customer, and/or equipment information describing the telephone equipment installed at the customer's residence or business. The Line Record Assembler module acquires any of this information and then assembles the information as the line record.

The Line Record Assembler module creates a more accurate line record. The Line Record Assembler module acquires information from dynamically-updated sources. Because the Line Record Assembler module acquires information from dynamically-updated sources, the Line Record Assembler module reduces reliance upon static databases of outdated information. Because the Line Record Assembler module acquires information from dynamically-updated sources, the Line Record Assembler module also reduces the need to manually update records. The Line Record Assembler module thus reduces the errors that degrade manually-entered information. The Line Record Assembler module thus creates a line record comprised of the freshest data available.

The Line Record Assembler module improves telephone service. Because the line record is now comprised of the freshest data, the telephone company has an accurate view of the telephone system. If a customer calls and reports a problem with their telephone service, the Line Record Assembler module provides a more accurate view of the customer, their service, and the telephone system. The telephone company can now more accurately identify the physical facility serving the customer and what telephone equipment is installed. The telephone company may now more quickly identify problems and implement faster response plans. Telephone service is improved and customers satisfaction improves.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

The present invention particularly relates to methods and systems for assembling a line record for a customer's telephone number. A "line record" describes a customer's telephone service, the condition of telephone system physical facility serving the customer, and the telephone equipment installed at the customer's residence or business. The line record, for example, may include at least one of the following types of information: a listed name for the customer, a service address, a location for the customer, working conditions at the service address, a class of service, listing information, port status information, and location route number. The line record could also include a cable and a line pair serving the customer, F1 and F2 lines serving the customer, a cross-connect box serving the customer, a terminal serving the customer, and, if needed, even a utility pole serving the customer. The line record could also include a universal service order code, a terminal address, and a remote terminal serving the customer. The line record may further include equipment information from a switch system. One embodiment communicates with a communications network and acquires, in real time, at least one of i) information associated with the customer's service, ii) facility information associated with the customer's service, and iii) information associated with equipment used by the customer. The acquired information is assembled as the line record.

An alternative embodiment communicates a request, over a communications network, for the line record. This alternative embodiment acquires, in real time, at least one of customer information from a Customer Record Information System, facility information from a Loop Facility Assignment Control System, and equipment information from a switch system. The acquired information is assembled as the line record, wherein each request for the line record is comprised of fresh data.

Another embodiment describes a method of creating a trouble ticket for repair of a problem with a telephone system. This method receives notification of the problem and acquires, in real time, at least one of customer information from a Customer Record Information System, facility information from a Loop Facility Assignment Control System, and equipment information from a switch system. The trouble ticket is generated using the acquired information. This method may compare a telephone number to a database of open trouble tickets, request a mechanized loop test to verify the problem, receive results of the mechanized loop test, and request an appointment to repair the problem.

Another aspect discloses a method of acquiring line records for a telephone number. This aspect communicates with a communications network and acquires, in real time, at least one of i) service information associated with the telephone number, ii) facility information associated with the telephone number, and iii) telephone equipment information associated with the telephone number. The acquired and displayed information may include at least one of customer information from a Customer Record Information System, facility information from a Loop Facility Assignment Control System, and equipment information from a switch system.

Still a further aspect describes a system for assembling line records for a telephone number. The system has a Line Record Assembler module communicating with a communications network and acquiring, in real time, at least one of i) service information associated with the telephone number, ii) facility information associated with the telephone number, and iii) telephone equipment information associated with the telephone number. A processor is capable of processing the acquired information and of assembling the acquired information into a line record. The service information may include customer information from a Customer Record Information System. The facility information may include facility information from a Loop Facility Assignment Control System. The telephone equipment information may include equipment information from a switch system.

Another aspect discloses a computer program product for assembling line records for a telephone number. The computer program product includes a computer-readable medium and a Line Record Assembler module. The Line Record Assembler module is stored on the medium. The Line Record Assembler module couples, over a communications network, to at least one of a Customer Record Information System, a Loop Facility Assignment Control System, and a switch system. The Line Record Assembler module acquires, in real time, at least one of i) service information associated with the telephone number, ii) facility information associated with the telephone number, and iii) telephone equipment information associated with the telephone number.

Figure 1:
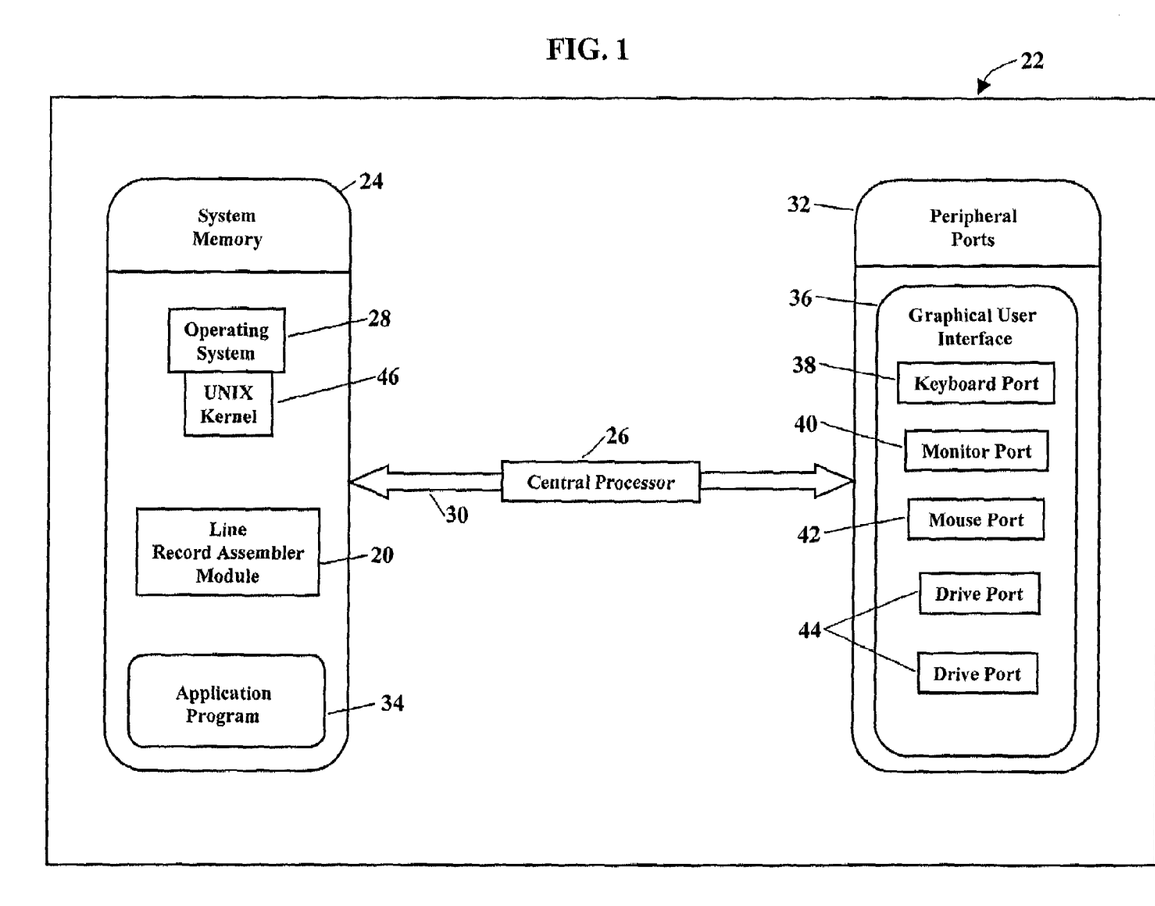
FIG. 1 is a block diagram showing the Line Record Assembler module 20 residing in a computer system.
Figure 2:
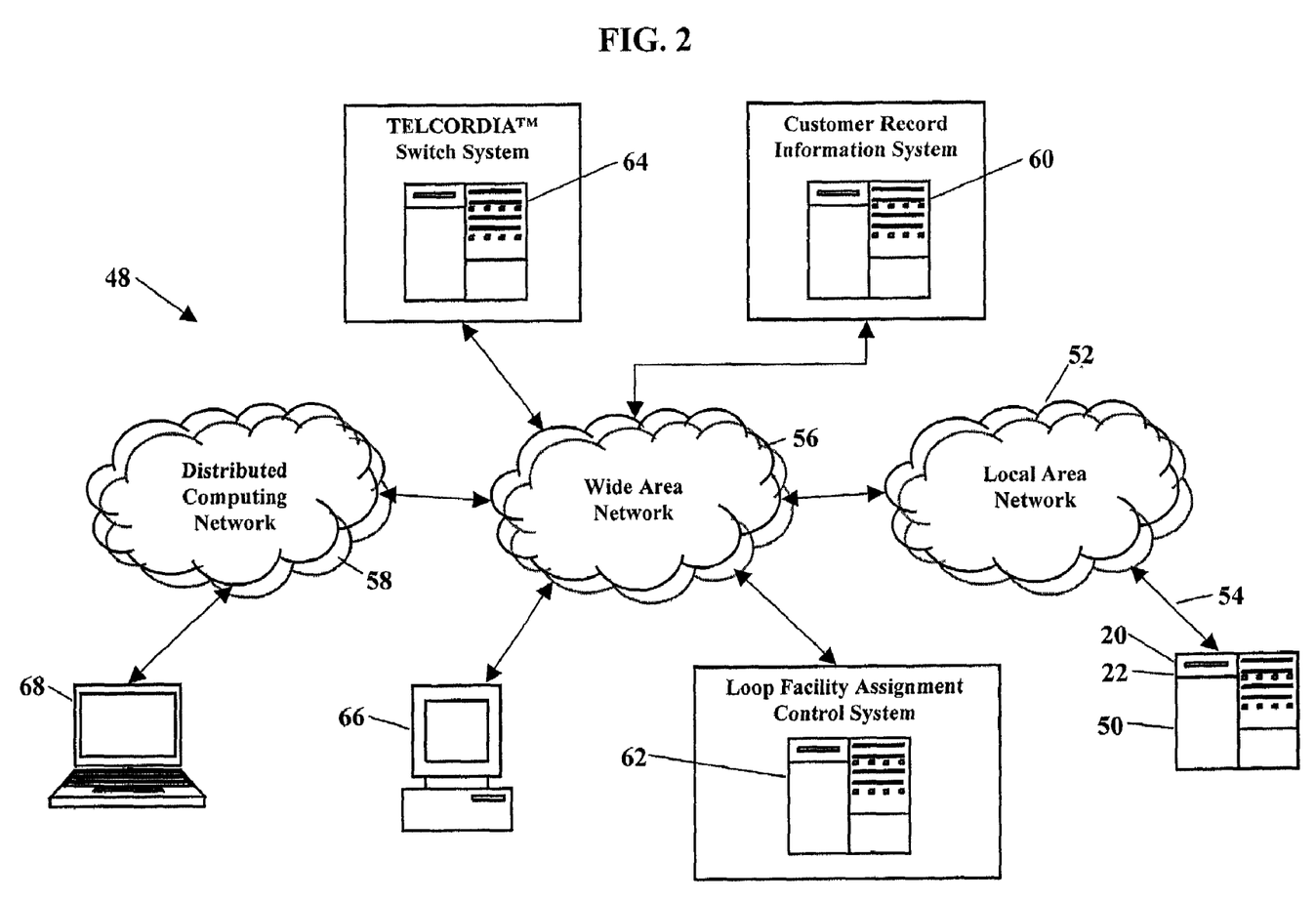
FIG. 2 is a block diagram of a communications network 48 representing the operating environment for the Line Record Assembler module 20.

FIGS. 1 and 2 depict a possible operating environment for an embodiment of the present invention. This embodiment of a Line Record Assembler module 20 comprises a computer program that acquires information in real time and assembles a line record. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Line Record Assembler Module 20 residing in a computer system 22. The Line Record Assembler Module 20 operates within a system memory device 24. The computer system 22 also has a central processor 26 executing an operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd., Santa Clara, Calif. 95052-8119, 408.765.8080). Other manufactures also offer microprocessors. Such other manufactures include Motorola, Inc. (1303 East Algonquin Road, P.O. Box A3309 Schaumburg, Ill. 60196, International Business Machines Corp. (New Orchard Road, Armonk, N.Y. 10504, (914) 499-1900), and Transmeta Corp. (3940 Freedom Circle, Santa Clara, Calif. 95054). While only one microprocessor is shown, those skilled in the art also recognize multiple processors may be utilized. Those skilled in the art further understand that the program, processes, methods, and systems described in this patent are not limited to any particular manufacture's central processor.

The preferred operating system 28 is the UNIX® operating system (UNIX® is a registered trademark of the Open Source Group,). Those skilled in the art also recognize many other operating systems are suitable. Other suitable operating systems include UNIX-based LINUX, WINDOWS NT® (WINDOWS NT® is a registered trademark of Microsoft Corporation, One Microsoft Way, Redmond Wash. 98052-6399, 425.882.8080), and Mac® OS (Mac® is a registered trademark of Apple Computer, Inc., 1 Infinite Loop, Cupertino, Calif. 95014, 408.996.1010). Those of ordinary skill in the art again understand that the program, processes, methods, and systems described in this patent are not limited to any particular operating system.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill well understand, a kernel portion 46 of the preferred UNIX® operating system 28 manages the interface between the application program 34, the input/output devices (the keyboard port 38, the monitor port 40, the mouse port 42, or the drive ports 44), the system memory 24, and the scheduling and maintenance of the file access system 20.

FIG. 2 is a block diagram of a communications network 48. This communications network 48 further represents an operating environment for the Line Record Assembler module 20. The Line Record Assembler module 20 resides within the memory storage device (shown as reference numeral 24 in FIG. 1) in the computer system 22. The computer system 22 is conveniently shown as a computer server 50, however, the Line Record Assembler module 20 may reside in any computer system. The computer server 50 communicates with a Local Area Network (LAN) 52 along one or more data communication lines 54. As those of ordinary skill in the art understand, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56 and with a globally-distributed computing network 58 (e.g. the "Internet). The communications network 48 allows the Line Record Assembler module 20 to request and acquire information from many computers connected to the Local Area Network 52, the Wide Area Network 56, and the globally-distributed computing network 58.

As FIG. 2 shows, the Line Record Assembler module 20 requests and acquires information from many other computers connected to the communications network 48. The Line Record Assembler module 20, for example, may acquire customer information from a server maintaining a Customer Record Information System database 60. The Line Record Assembler module 20 may also acquire facility information from a server maintaining a Loop Facility Assignment Control System database 62. The Line Record Assembler module 20 may also acquire terminal equipment information from a server maintaining a switch system database 64. One such switch system database is the TELCORDIA™ SWITCH™ system. The Line Record Assembler module 20 may communicate this acquired information over the communications network 48 to a user at a user computer 66. FIG. 2 even shows that remote users, such as programmers and engineers, may use a portable computer 68 to dial into the communications network 48 and remotely access the Line Record Assembler module 20. Because many computers may be connected to the communications network 48, computers and computer users may share and communicate a vast amount of information.

Figure 3:
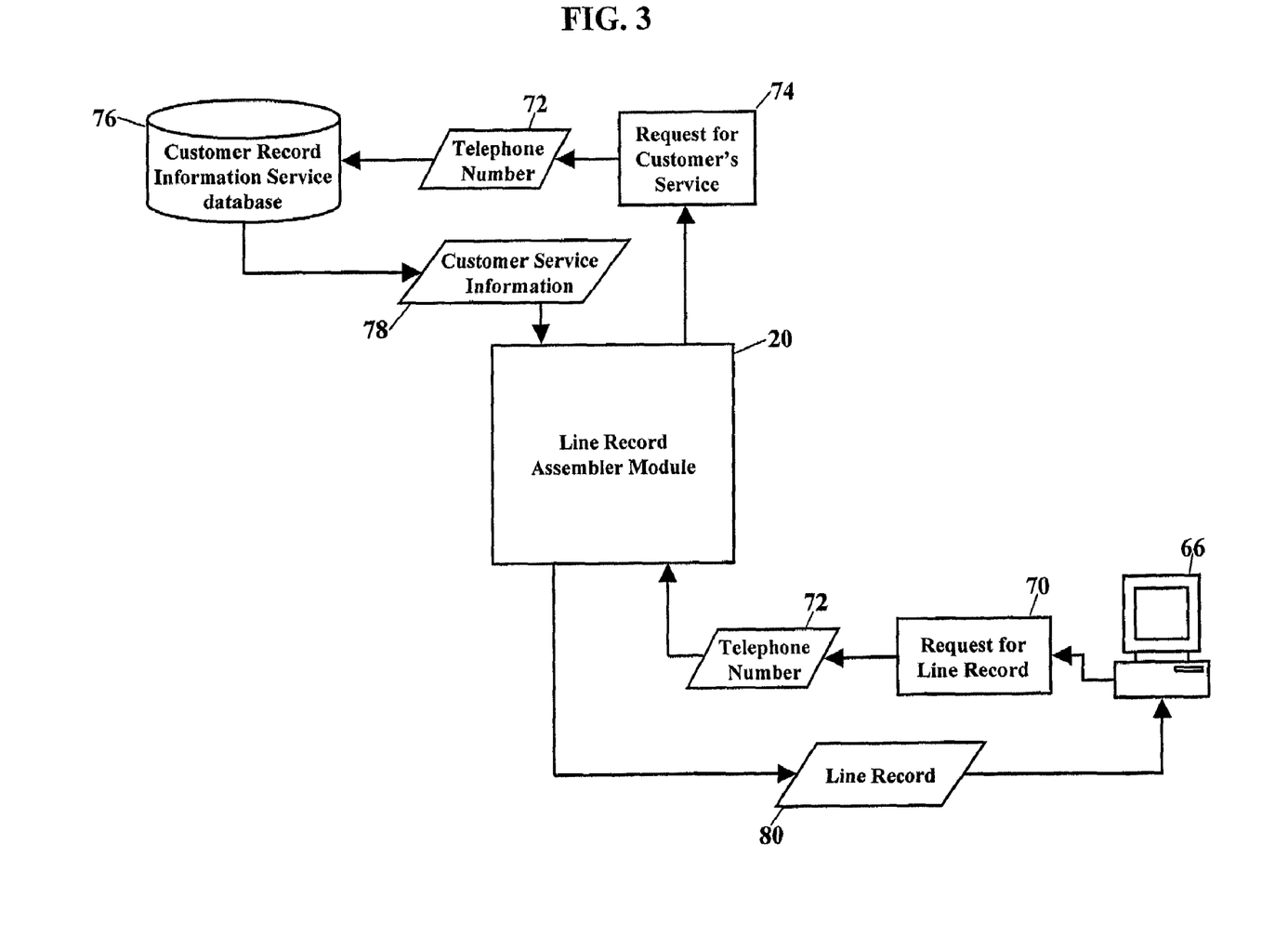
FIG. 3 is a block diagram showing one embodiment of the Line Record Assembler module 20.

FIG. 3 is a block diagram showing one embodiment of the Line Record Assembler module 20. The Line Record Assembler module 20, in this embodiment, is a computer program that acquires information from the communications network (shown as reference numeral 48 in FIG. 2) and uses this information to construct a line record for a telephone number. As FIG. 3 illustrates, the user at the user computer 66 issues a request 70 for a line record. The request 70 for the line record is communicated over the communications network to the Line Record Assembler module 20. The request 70 for the line record also contains information representing a telephone number 72 for which the line record is sought. The Line Record Assembler module 20 receives the request 70 for the line record, containing the information representing the telephone number 72, and then requests information to construct the line record.

The Line Record Assembler module 20 may retrieve customer information. When the Line Record Assembler module 20 receives the request 70 for the line record, the Line Record Assembler module 20 issues a request 74 for the customer's service. This request 74 for the customer's service also contains the telephone number 72 for which the customer's service information is sought. The request 74 for the customer's service is communicated over the communication network (shown as reference numeral 48 in FIG. 2) to a Customer Record Information Service (CRIS) database 76. The Customer Record Information Service database 76 retrieves customer service information 78 associated with the telephone number 72. The Line Record Assembler module 20 acquires the customer service information 78, stores the customer service information 78, and then assembles a line record 80 containing the customer service information 78. The line record 80 is returned to the user at the user computer 66.

The customer service information 78 describes many aspects of the customer's telephone service. The customer service information 78 may include the listed name for the telephone number 72, a service address for the telephone number 72, a location for the telephone number 72, and the working conditions associated with the telephone number 72. The customer service information 78 may also include the class of service for the telephone number 72, listing information for the telephone number 72, port status information for the telephone number 72, and location route number information for the telephone number 72. The customer service information 78 could also include the local office associated with the telephone number 72, an exchange associated with the telephone number 72, a foreign office associated with the telephone number 72, the local telephone service provider, and the service rate associated with the telephone number 72. The customer service information 78 could include caller identification service associated with the telephone number 72, local usage associated with the telephone number 72, the wire maintenance center associated with the telephone number 72, any essential services associated with the telephone number 72, and whether coin-operated equipment is associated with the telephone number 72. The customer service information 78 could also include billing information for the telephone number 72, payments records for the telephone number 72, and call logs for the telephone number 72. The customer service information 78 could even include special language needs (e.g., French or Spanish) and cultural differences (e.g., religious holidays and customs). The customer service information 78, in short, represents any information that helps telephone service providers identify the customer and the customer's telephone service.

The Line Record Assembler module 20 operates in real time. Because the Line Record Assembler module 20 constructs the line record 80 in response to each request 70 for the line record, the line record 80 contains the freshest data possible. The Line Record Assembler module 20 is not extracting old data from a static source. The Line Record Assembler module 20 interfaces with the Customer Record Information Service (CRIS) database 76. The Customer Record Information Service database 76 is dynamically updated, so the Line Record Assembler module 20 acquires the latest, most correct customer service information 78. The Line Record Assembler module 20 reduces the instances of out-dated and corrupt line records. The line record 80 thus contains real time, accurate customer service information 78.

Figure 4:
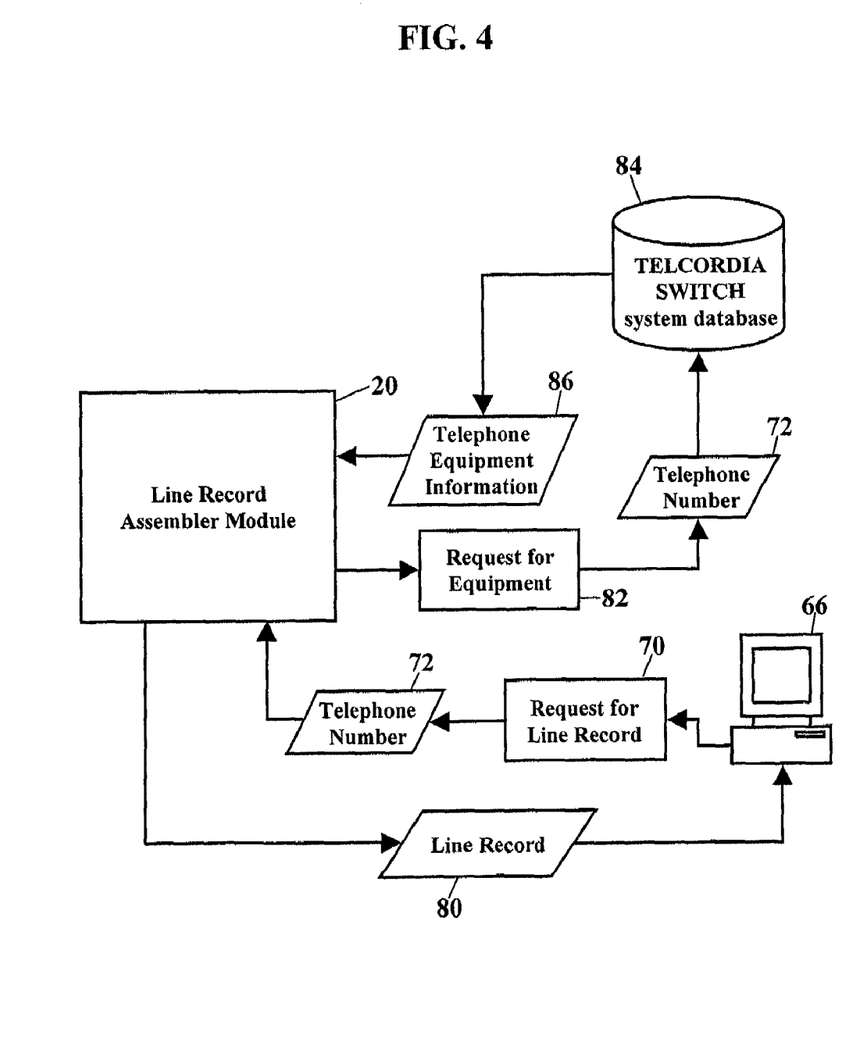
FIG. 4 is a block diagram showing another embodiment of the Line Record Assembler module 20.

FIG. 4 is a block diagram showing another embodiment of the Line Record Assembler module 20. While this embodiment is similar to that shown in FIG. 3, this embodiment acquires different information from a different source. The user at the user computer 66 issues the request 70 for the line record. The Line Record Assembler module 20 receives the request 70 for the line record, containing the information representing the telephone number 72, and then issues a request 82 for equipment associated with the telephone number 72. The request 82 for equipment is communicated over the communication network (shown as reference numeral 48 in FIG. 2) to a TELCORDIA™ SWITCH™ system database 84 (TELCORDIA™ and SWITCH™ are trademarks of Telcordia Technologies, Inc., 445 South St., Morristown N.J. 07960). As those of ordinary skill recognize, the SWITCH™ system is an operations support system that provides inventory and assignment support for central office switching equipment and related facilities. Although the SWITCH™ system provides many services, one service of the SWITCH™ system is to inventory and administer telephone equipment and telephone numbers. The TELCORDIA™ SWITCH™ system database 84 retrieves telephone equipment information 86 associated with the telephone number 72. The telephone equipment information 86 describes what telephone equipment is associated with the telephone number 72. The telephone equipment information 86 may describe terminal equipment, central office equipment, and other telephone-related equipment. The Line Record Assembler module 20 acquires the telephone equipment information 86, stores the telephone equipment information 86, and then assembles the line record 80 containing the telephone equipment information 86. The Line Record Assembler module 20, as explained above, operates in real time so the line record 80 contains real time, accurate telephone equipment information 86.

The TELCORDIA™ SWITCH™ system is currently the preferred source of the telephone equipment information 86. While another vendor's and system may provide the same, or similar, terminal equipment information, the TELCORDIA™ SWITCH™ system is currently used in the preferred embodiment. As those of ordinary skill recognize, other vendors and other systems may also provide suitable alternatives to the TELCORDIA™ SWITCH™ system.

Figure 5:
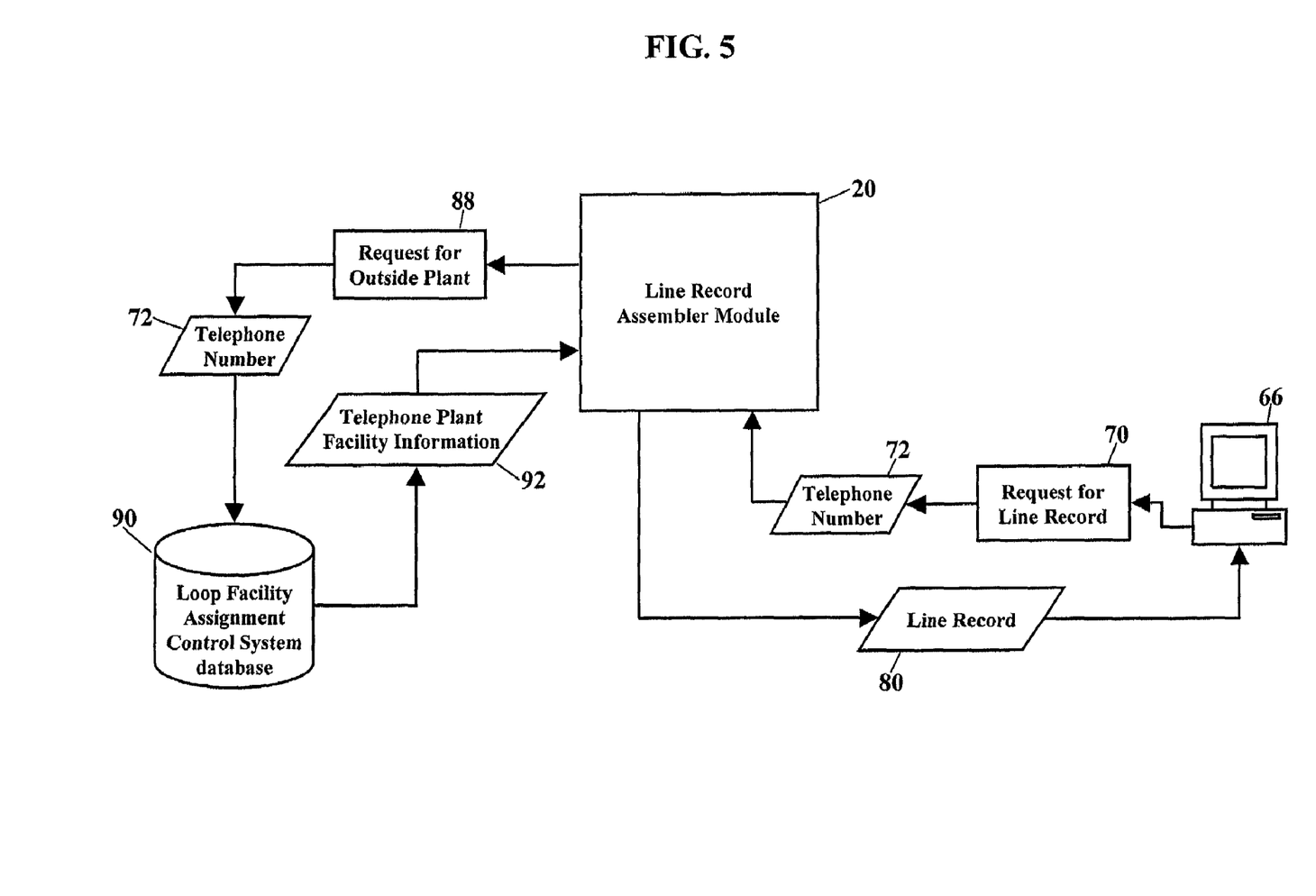
FIG. 5 is a block diagram showing a further embodiment of the Line Record Assembler module 20.

FIG. 5 is a block diagram showing a further embodiment of the Line Record Assembler module 20. The user at the user computer 66 issues the request 70 for the line record and the Line Record Assembler module 20 receives the request 70 for the line record. The Line Record Assembler module 20 then issues a request 88 for outside plant facility information associated with the telephone number 72. The request 88 for outside plant facility information is communicated over the communication network (shown as reference numeral 48 in FIG. 2) to a Loop Facility Assignment Control System (LFACS) 90. The Loop Facility Assignment Control System 90 retrieves telephone plant facility information 92 associated with the telephone number 72. The Line Record Assembler module 20 acquires the telephone plant facility information 92, stores the telephone plant facility information 92, and then assembles the line record 80 containing the telephone plant facility information 92. The Line Record Assembler module 20, again, operates in real time so the line record 80 contains real time, accurate telephone plant facility information 92.

The telephone plant facility information 92 describes many aspects of the telephone system physical plant. The telephone plant facility information 92, for example, may include the cable and line pair associated with the telephone number 72. The telephone plant facility information 92 may also include the F1 and F2 lines associated with the telephone number 72, a cross-connect box associated with the telephone number 72, a terminal associated with the telephone number 72, and, if needed, even a utility pole associated with the telephone number 72. The telephone plant facility information 92 could also include a universal service order code, a terminal address, and a remote terminal associated with the telephone number 72. The telephone plant facility information 92 could include any information that describes telephone system physical plant characteristics.

Figure 6:
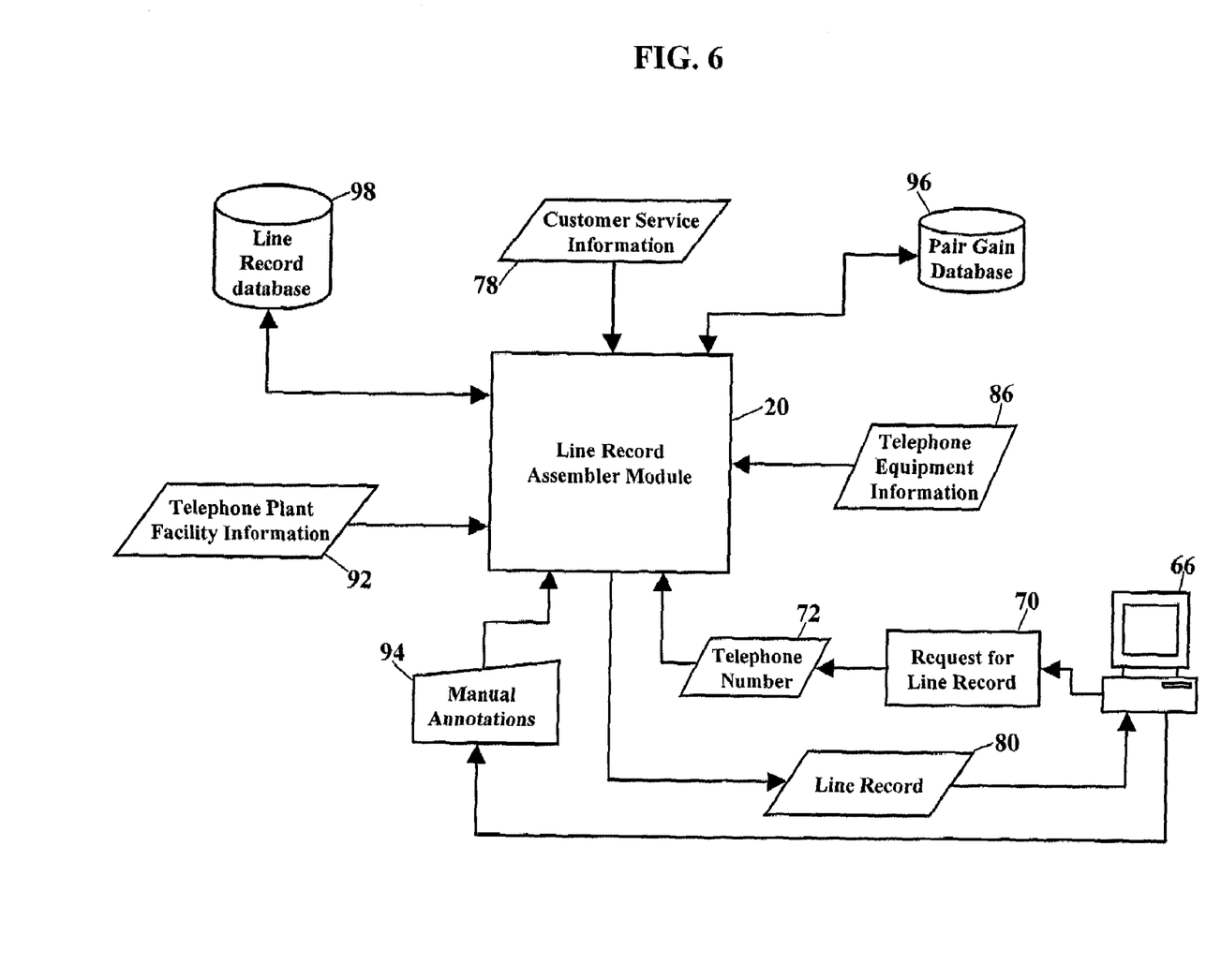
FIG. 6 is a block diagram describing still another embodiment of the Line Record Assembler 20.

FIG. 6 is a block diagram describing still another embodiment of the Line Record Assembler 20. FIG. 6 shows the Line Record Assembler 20 may also accept manually-entered annotations 94. Once the Line Record Assembler 20 acquires at least one of the customer service information 78, the telephone equipment information 86, and the telephone plant facility information 92, the user at the user computer 66 may manually annotate the line record 80. The user may, for example, annotate the line record 80 with a description of any telephone system trouble experienced by a customer. The line record 80 could also be annotated with information indicating when the customer may be contacted, when a repair technician may access a residence, or when a repair technician may access a business. The line record 80 could also reflect an irate customer, an urgent repair or installation, or the name of the annotating user. The line record 80, in short, could be annotated with any information that improves customer service, reduces response times, or saves money.

FIG. 6 also shows the Line Record Assembler 20 may interface with a pair gain database 96 and with a Line Record database 98. The pair gain database 96 contains supplemental data on the telephone system physical plant. The supplemental data, for example, may describe digital loop carrier equipment, subscriber line equipment, or other unique equipment or characteristics for the telephone system physical plant. The Line Record Assembler 20 may interface with the pair gain database 96, acquire this supplemental data, and assemble into the line record 80. Once the line record 80 is assembled, the line record 80 may be stored in the Line Record database 98. The Line Record database 98 maintains a database of recently-assembled line records. The Line Record database 98 stores the line record 80 for a limited time. The Line Record database 98 provides faster access to the recently-assembled line record 80. The Line Record database 98 eliminates repeatedly assembling the line record 80 when the acquired information has not recently changed. The Line Record database 98 could store the line record 80 for seven days, two weeks, or any duration desired. The longer the Line Record database 98 stores the line record 80, however, the more likely the line record 80 is comprised of corrupt information.

Figure 7:
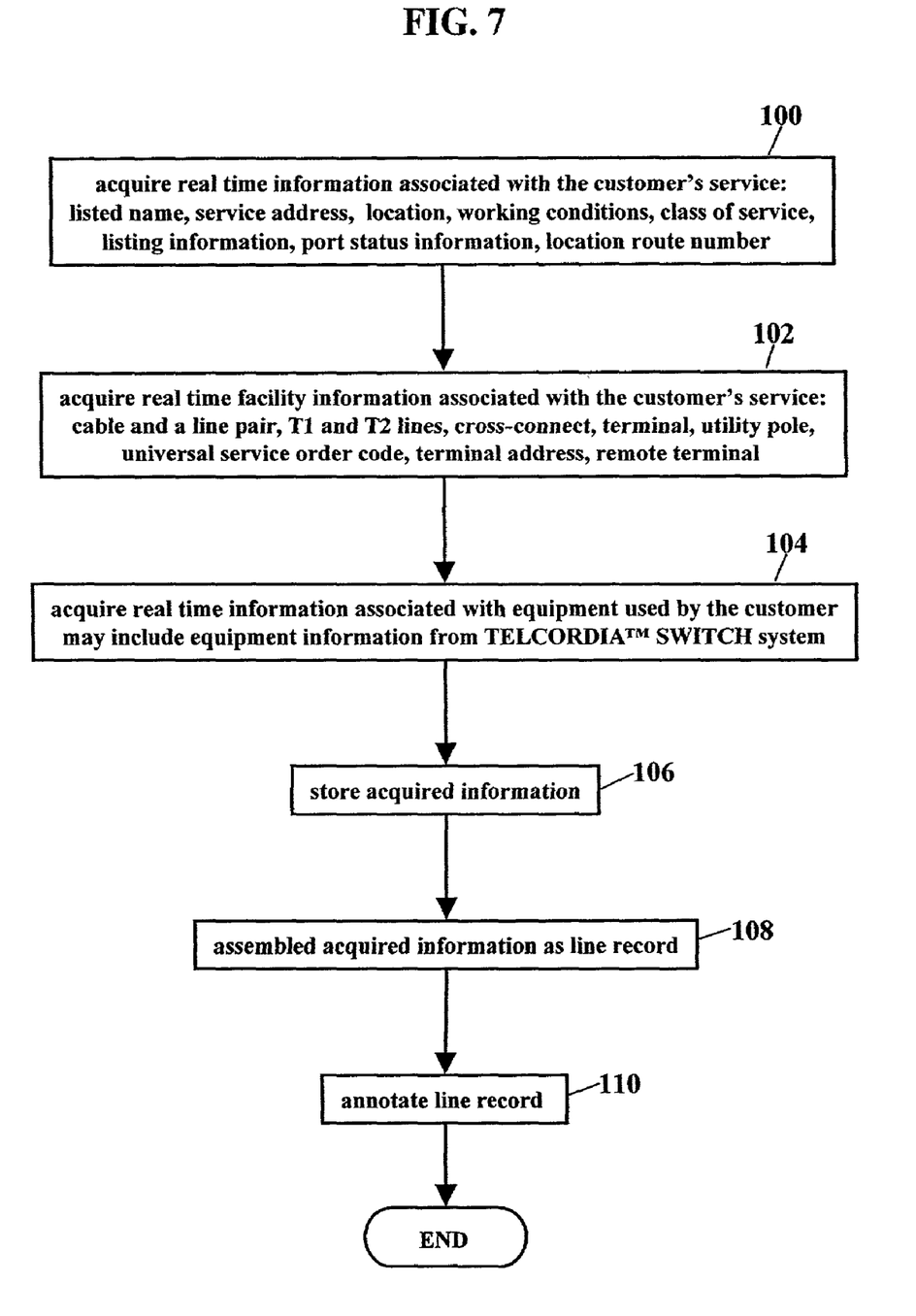
FIG. 7 is a flowchart describing a method of assembling a line record for a customer's telephone number.

FIG. 7 is a flowchart describing a method of assembling a line record for a customer's telephone number. The method includes communicating with a communications network and acquiring, in real time, at least one of i) information associated with the customer's service (Block 100), ii) facility information associated with the customer's service (Block 102), and iii) information associated with equipment used by the customer (Block 104). The acquired information is stored (Block 106) and then assembled as the line record (Block 108).

The acquired information forms the line record. The i) information associated with the customer's service may include at least one of a listed name for the customer, a service address, a location, and working conditions at the service address. The i) information associated with the customer's service may also include at least one of class of service, listing information, port status information, and location route number. The ii) facility information associated with the customer's service may include a cable and a line pair serving the customer, F1 and F2 lines serving the customer, a cross-connect box serving the customer, a terminal serving the customer, and, if needed, even a utility pole serving the customer. The ii) facility information could also include a universal service order code, a terminal address, and a remote terminal serving the customer. The iii) information associated with equipment used by the customer may include equipment information from the TELCORDIA™ SWITCH™ system.

The method may also include annotating the line record (Block 110). The line record may be annotated with at least one of when the customer may be contacted, when a repair technician may access the customer's business, and when a repair technician may access the customer's residence. The line record could also be annotated with the urgency of the repair, information indicating an irate customer, and information indicating whom is creating the work order.

Figure 8:
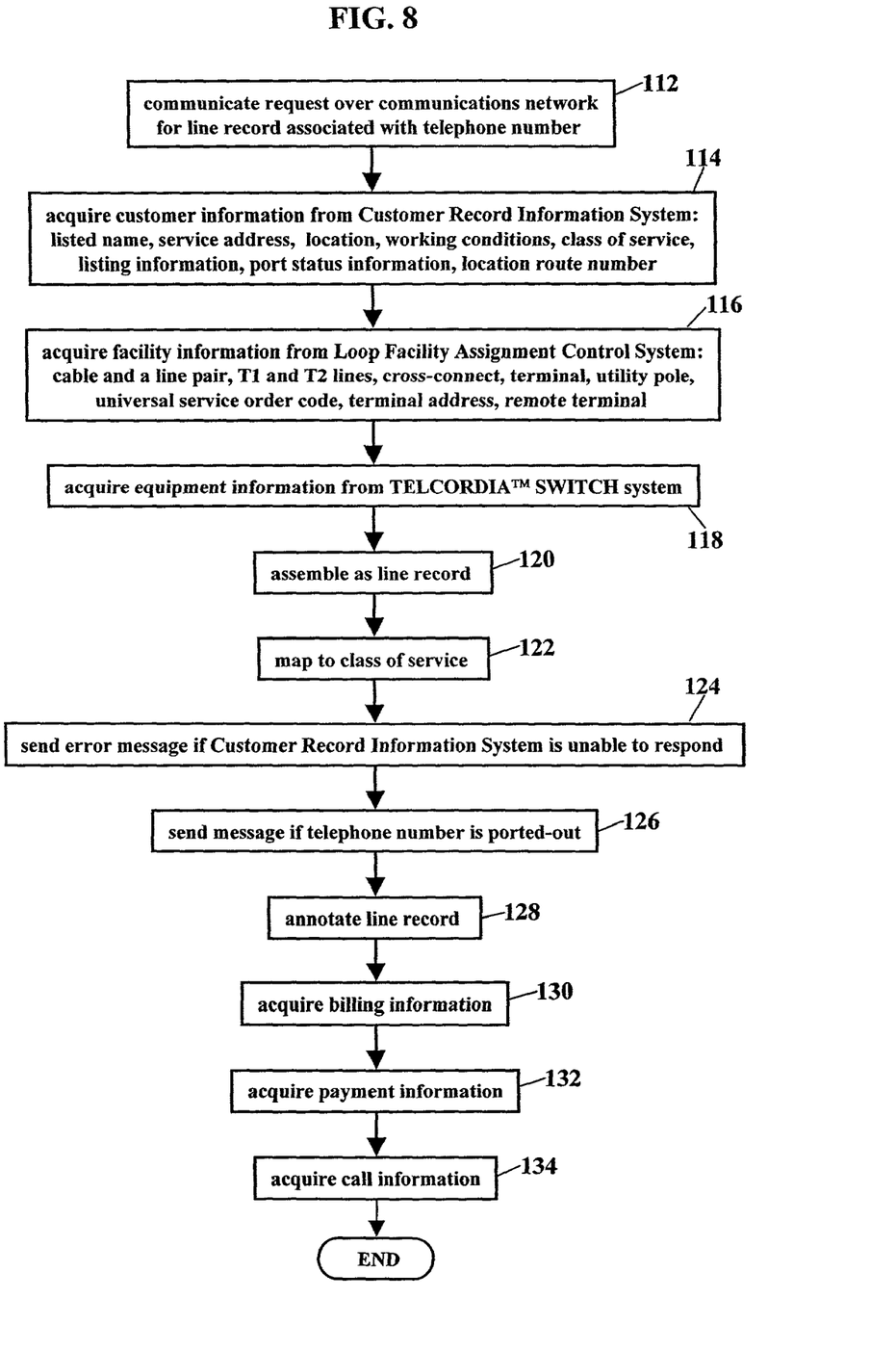
FIG. 8 is a flowchart describing an alternative method of assembling a line record for a telephone number.

FIG. 8 is a flowchart describing an alternative method of assembling a line record for a telephone number. The method includes communicating a request, over a communications network, for the line record associated with the telephone number (Block 112). The method acquires at least one of customer information from a Customer Record Information System (Block 114), facility information from a Loop Facility Assignment Control System (Block 116), and equipment information from a TELCORDIA™ SWITCH™ system (Block 118). Once this information is acquired, the method assembles the acquired information as the line record (Block 120). A maintenance class of service may be derived by mapping to a class of service from the Customer Record Information System (Block 122). An error message may be sent if the Customer Record Information System is unable to respond (Block 124). A message could also be sent if the telephone number is ported-out (Block 126).

The acquired information is used to construct the line record. The customer information from the Customer Record Information System may include at least one of a listed name, an address, a location, and working conditions associated with the telephone number. The customer information could also include listing information, location route number, and porting information. The facility information from a Loop Facility Assignment Control System may include a cable and a line pair, F1 and F2 lines, a cross-connect box, a terminal, and a utility pole associated with the telephone number. The facility information could also include a universal service order code, a terminal address, and a remote terminal associated with the telephone number. The equipment information from the TELCORDIA™ SWITCH™ system includes terminal equipment associated with the telephone number.

FIG. 8 also shows the method may annotate the line record (Block 128). The line record may be annotated with at least one of a description of current trouble, a description of past trouble, and a description of historical repairs associated with the telephone number. Annotation may also include when the customer may be contacted, when a repair technician may access the customer's business, and when a repair technician may access the customer's residence. Annotation could also include the urgency of the repair, an irate customer, and a user requesting the line record.

The method may also acquire billing information (Block 130), payment information (132), and call information (Block 134). The billing information could include one or more monthly phone bills, average monthly phone bill, and other billing information. The payment information could include a customer's payment history, the dates payments were received, why a customer's telephone service was deactivated, and other payment information. The call information may include a log of calls on a daily, weekly, monthly, or other schedule.

Figure 9:
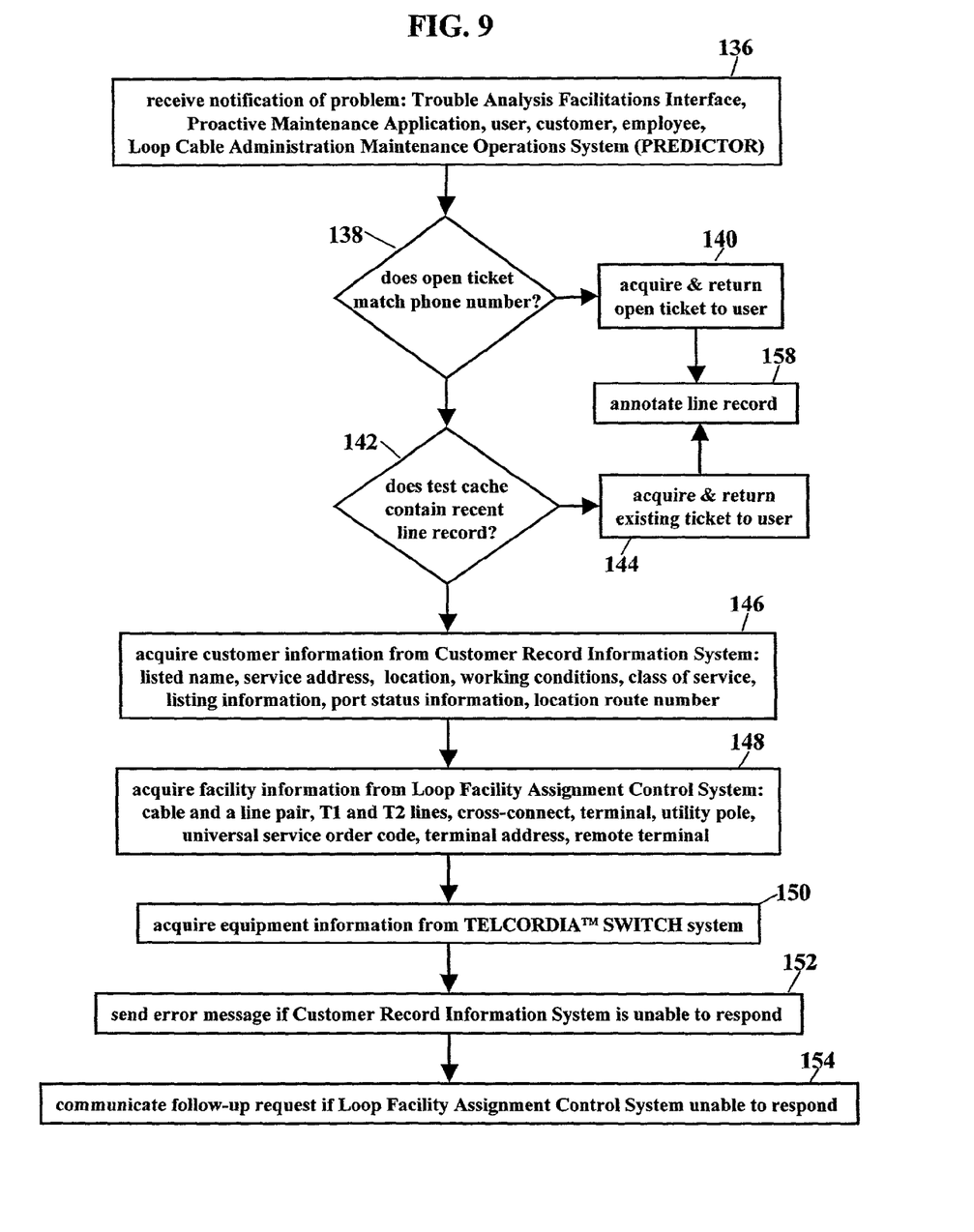
FIGS. 9 and 10 are flowcharts describing a method of creating a trouble ticket for repair of a problem with a telephone system.
Figure 10:
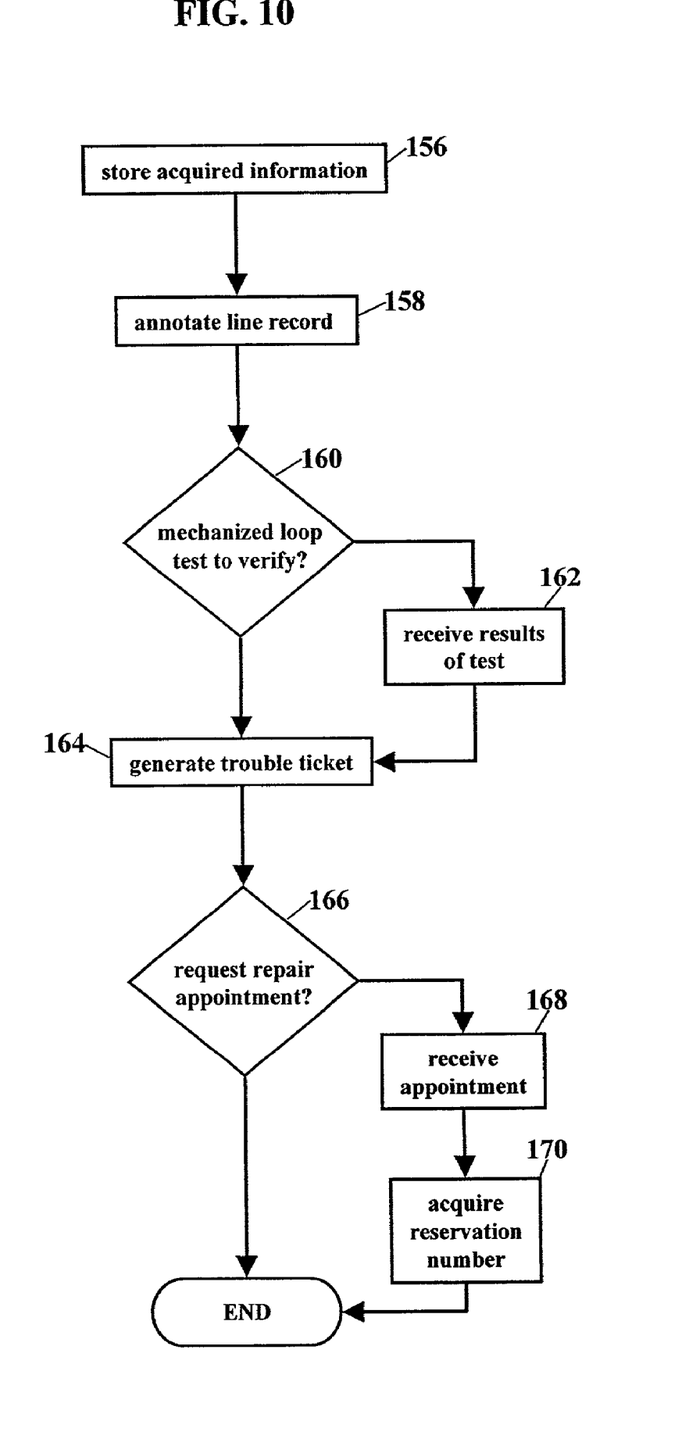

FIGS. 9 and 10 are flowcharts describing a method of creating a trouble ticket for repair of a problem with a telephone system. The method receives notification of the problem (Block 136). The notification may be received from a Trouble Analysis Facilitations Interface, from a Proactive Maintenance Application, from a user, from a call from a customer, from an employee of the telephone system, and from a Loop Cable Administration and Maintenance Operations System. The method checks if an existing and open trouble ticket matches the same telephone number (Block 138). If an open trouble ticket already exists, the method acquires the existing, open trouble ticket and returns the open trouble ticket to a user (Block 140). The method also checks a testing cache (such as the Line Record database, shown as reference number 98, in FIG. 6) to see if a recent line record already exists (Block 142). If the testing cache contains a recent line record, the recent line record is acquired and returned to the user (Block 144). If no recent line record exists in the testing cache, the method acquires at least one of customer information from a Customer Record Information System (Block 146), facility information from a Loop Facility Assignment Control System (Block 148), and equipment information from a TELCORDIA™ SWITCH™ system (Block 150). If the Customer Record Information System is unable to respond to the acquisition, an error message may be sent (Block 152). If the Loop Facility Assignment Control System is unable to respond to the acquisition, the method may communicate a follow-up request (Block 154).

FIG. 10 continues describing the method of creating the trouble ticket. Once the information is acquired, the acquired information may be stored (Block 156). The user may annotate the line record (Block 158). The user may request a mechanized loop test to verify the problem (Block 160). If the user does request a mechanized loop test, the method receives the results of the mechanized loop test (Block 162). The trouble ticket is generated using the acquired information (Block 164). The user may request (Block 166) and receive (Block 168) an appointment to repair the problem. The user may also acquire a reservation number for the appointment (Block 170).

Figure 11:
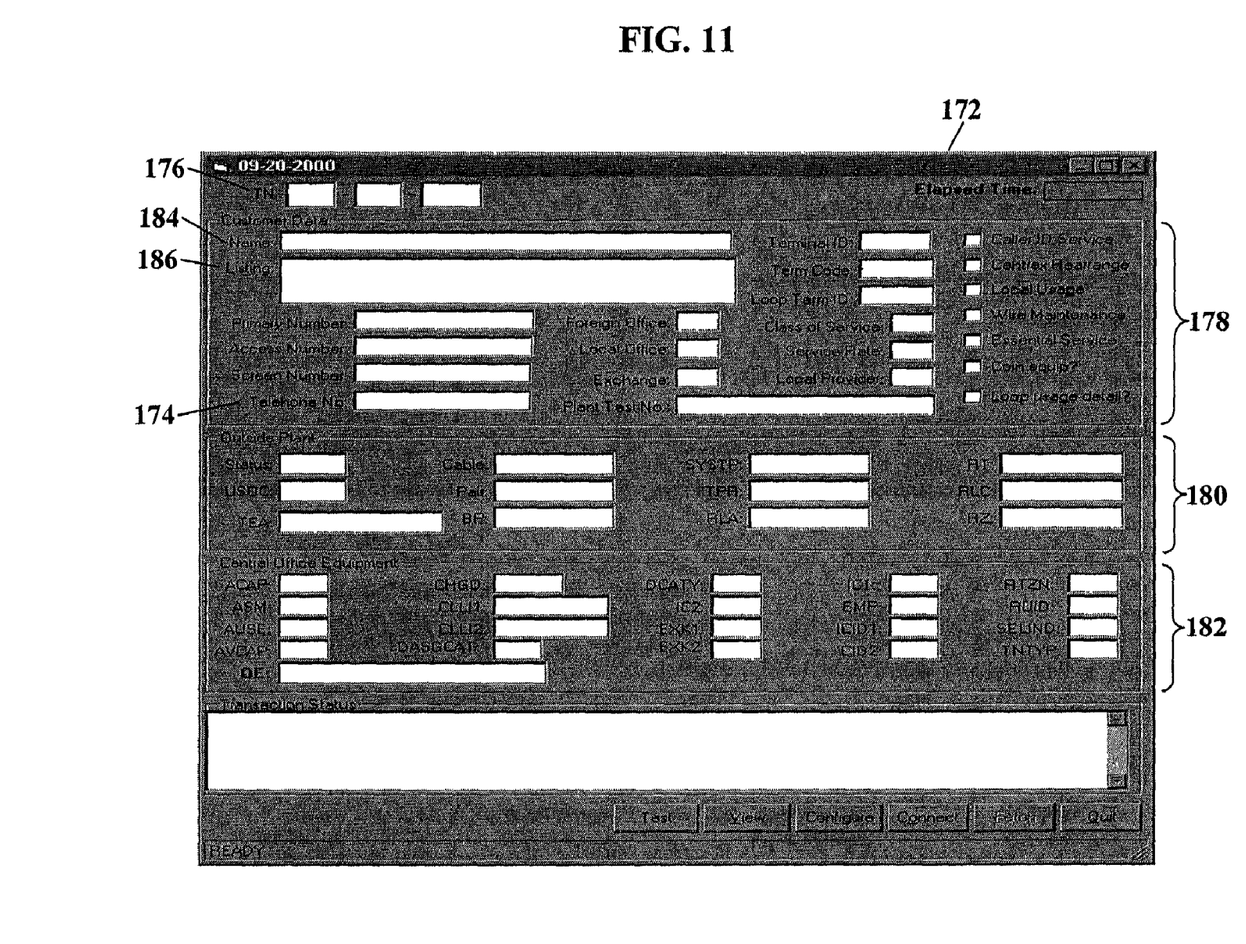
FIG. 11 is a schematic drawing of a computer user interface 172 for displaying line records.

FIG. 11 is a schematic drawing of a computer user interface 172 for displaying line records. A user enters a telephone number 174 or a service ticket number 176 and the Line Record Assembler module (shown as reference number 20 in FIGS. 1–6) communicates with a communications network and acquires, in real time, at least one of the service information 178, the facility information 180, and the telephone equipment information 182. The service information 178 includes customer information from a Customer Record Information System. The user interface 172, for example, may display a listed name 184 of the telephone number and corresponding listing information 186. The listing information could include an address for the telephone number, the location of the telephone number, and special or hazardous working conditions associated with the telephone number. The user interface 176 may also display various indications of the customer's telephone service, including the class of service associated with the telephone number, a local office associated with the telephone number, an exchange associated with the telephone number, a foreign office associated with the telephone number, the local telephone service provider associated with the telephone number, and the service rate associated with the telephone number. Caller identification service could also be displayed, along with whether the customer's service is restricted to local usage or whether coin-operated equipment is associated with the telephone number. The user interface 176 could also include the wire maintenance center, a primary number, an access number, and a screen number. A terminal identification, terminal code, and a loop terminal identification would also help identify customer's service.

The user interface 176 may also display the physical plant facility information 178 and the telephone equipment information 180. The facility information 178 includes information from a Loop Facility Assignment Control System. The facility information 178 could include the cable, cross-connect, terminal, and line pair associated with the telephone number. The user interface 176 may also display plant status, a universal service order code associated with the telephone number, a terminal address associated with the telephone number, and a remote terminal associated with the telephone number. The telephone equipment information 180 includes information from a TELCORDIA™ SWITCH™ system. The equipment information 180 could include the terminal equipment associated with the telephone number.

The Line Record Assembler module (shown as reference numeral 20 in FIGS. 1–6) may be physically embodied on or in a computer-readable medium. This computer-readable medium may include a CD-ROM, DVD, tape, cassette, floppy disk, memory card, and a large-capacity disk (such as IOMEGA® ZIP®, JAZZ®, and other large-capacity memory products) (IOMEGA®, ZIP®, and JAZZ ® are registered trademarks of Iomega Corporation, 1821 W. Iomega Way, Roy, Utah 84067, 801.332.1000). This computer-readable medium, or media, could be distributed to end-users, licenses, and assignees. These types of computer readable media, and other types not mentioned here but considered within the scope of the present invention, allow the Line Record Assembler module to be easily disseminated. A computer program product for assembling line records for a telephone number comprises the computer-readable medium and the Line Record Assembler module. The Line Record Assembler module is stored on the medium. The Line Record Assembler module couples, over a communications network, to at least one of a Customer Record Information System, a Loop Facility Assignment Control System, and a TELCORDIA® SWITCH® system. The Line Record Assembler module acquires, in real time, at least one of i) service information associated with the telephone number, ii) facility information associated the with telephone number, and iii) telephone equipment information associated with the telephone number.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of assembling line records for customer telephone service, comprising:

receiving a request to assemble a line record, the request originating from a portable computer;

in response to the request, communicating with a communications network and acquiring, in real time, i) information associated with a customer's telephone service, ii) facility information associated with the customer's telephone service, and iii) information associated with equipment used by the customer;

storing the acquired information for a limited time;

assembling the acquired information as a line record;

annotating the line record with information indicating a description of a trouble with the customer's telephone service;

annotating the line record with at least one of information indicating when the customer may be contacted, information indicating when a repair technician may access the customer's business, and information indicating when a repair technician may access the customer's residence;

annotating the line record with at least one of information indicating the urgency of a repair, information indicating an irate customer, and information indicating whom is creating a work order;

acquiring billing information including monthly phone bills, and average monthly phone bill;

acquiring payment information including at least one of customor's payment history, the dates payments were received, and why a customer's telephone service was deactivate; and acquiring call information including a log of calls.

2. A method of assembling a line record according to claim 1, wherein acquiring information associated with the customer's telephone service comprises acquiring customer information from a Customer Record Information System.

3. A method of assembling a line record according to claim 1, wherein acquiring information associated with the customer's telephone service comprises acquiring information associated with at least one of a listed name for the customer, a service address, a location, and working conditions at the service address.

4. A method of assembling a line record according to claim 1, wherein acquiring information associated with the customer's telephone service comprises acquiring information associated with at least one of class of service, listing information, port status information, and location route number.

5. A method of assembling a line record according to claim 1, wherein acquiring facility information associated with the customer's telephone service comprises acquiring facility information from a Loop Facility Assignment Control System.

6. A method of assembling a line record according to claim 1, wherein acquiring facility information associated with the customer's telephone service comprises acquiring information associated with a cable and a line pair serving the customer.

7. A method of assembling a line record according to claim 1, wherein acquiring facility information associated with the customer's telephone service comprises acquiring information associated with a terminal serving the customer.

8. A method of assembling a line record according to claim 1, wherein acquiring facility information associated with the customer's telephone service comprises acquiring information associated with a line pair serving the customer.

9. A method of assembling a line record according to claim 1, wherein acquiring information associated with equipment used by the customer comprises acquiring equipment information from a TELCORDIA™ SWITCH system.

10. A method of assembling a line record according to claim 1, wherein acquiring information associated with equipment used by the customer comprises acquiring information associated with terminal equipment serving the customer.

* * * * *